Figure 4:
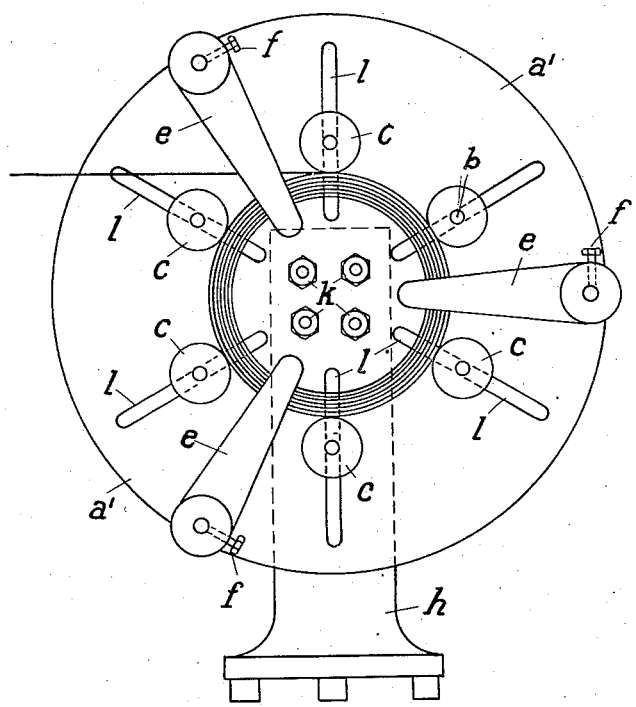

Oct. 1, 1929.                C. MATTHAEI                 1,729,955
        APPARATUS FOR UNWINDING COILED WIRE, BAND IRON, AND THE LIKE
                    Filed Feb. 21, 1927        2 Sheets-Sheet 1
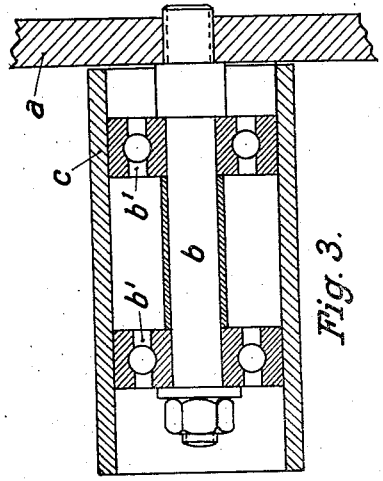
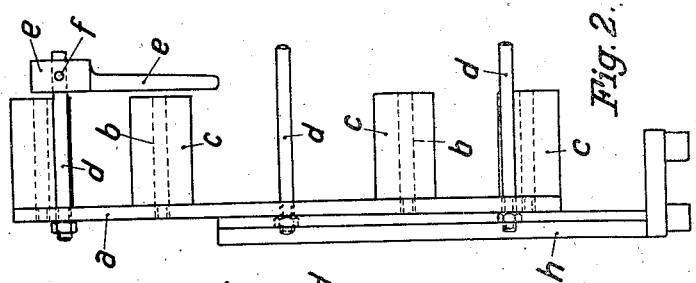
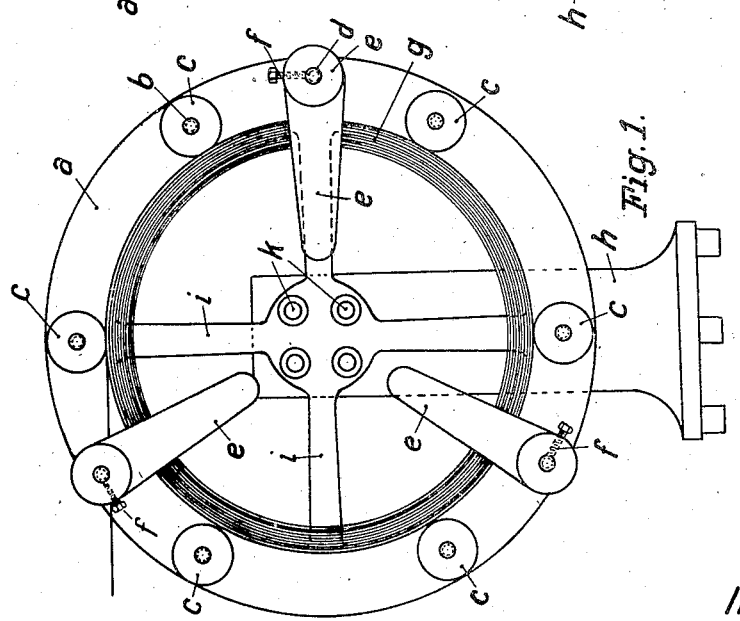
Inventor:
Curt Matthaei,
By Byrnes Townsend & Brickenstein,
       Attorneys.

Oct. 1, 1929.    C. MATTHAEI    1,729,955
APPARATUS FOR UNWINDING COILED WIRE, BAND IRON, AND THE LIKE
Filed Feb. 21, 1927    2 Sheets-Sheet 2

Inventor:
Curt Matthaei,
By Byrne Townsend & Brickenstein,
Attorneys.

Patented Oct. 1, 1929

1,729,955

UNITED STATES PATENT OFFICE

CURT MATTHAEI, OF OFFENBACH-ON-THE-MAIN, GERMANY

APPARATUS FOR UNWINDING COILED WIRE, BAND IRON, AND THE LIKE

Application filed February 21, 1927, Serial No. 169,938, and in Germany February 27, 1926.

My invention relates to an improved device or apparatus for unwinding wires, band-iron and the like which are usually supplied by the trade in coiled condition or annular form.

The object of my invention is to provide a device of the above stated kind which is extremely simple and compact in construction, efficient and reliable in operation and highly practical as regards the purpose of expediting and facilitating the unwinding operation, as the wire, band-iron or the like is gradually worked up or consumed in or by a moulding press, a machine tool or any other automatic working machine.

With this object in view I preferably construct the device to form a stationary open casing of, so to say, cylindrical shape in which the annular coil of wire, band-iron or the like is supported in a manner to be free to revolve therein while being unwound from the inner periphery thereof. The one end face or wall of the casing may be in the form of a disk or a ring having radial arms, whilst the peripheral part thereof is preferably constituted by a system of symmetrically arranged and diametrically opposed rollers for the coiled body of wire or the like to abut against owing to the springiness inherent in the same, when the coil of wire or the like is inserted in place and the tying wires which usually hold the windings together, have been cut. The other end face or wall of the casing is substantially open and a plurality of arms only are provided which are supported by and movably connected with the said disk- or ring-shaped end wall so as to be rotatable in a plane substantially parallel to the plane of the said disk- or ring-shaped end wall. The said arms, preferably three in number, serve the purpose of holding the coil of wire or the like in place on the rollers and prevent the same from displacement in axial direction.

Before proceeding to describe the specific construction of the device which I have selected as best embodying my invention I desire to have it understood that the said construction is not the only embodiment of which the invention is capable, that a wide range of equivalents may be employed for the parts which I have illustrated in the accompanying drawings and will hereinafter describe with reference to said drawings, and that the phraseology which I have adopted, is for the purpose of description and not of limitation except where the sense absolutely requires it.

Figure 5:
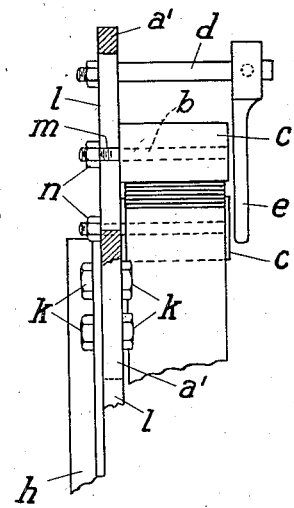

In the accompanying drawings forming a part of this specification, and showing for purposes of exemplification a preferred form and manner in which the invention may be embodied and practised, but without limiting the claimed invention to such instance:

Figure 1 is a front elevation of my improved device or apparatus; Figure 2 is a side view thereof; Figure 3 is a view in vertical section of one of the rollers showing the same on an enlarged scale; Fig. 4 is a front elevation of a modified construction, and Fig. 5 is a fragmentary vertical section through the device and taken along one of the radial slots of the supporting disk.

Corresponding and like parts are referred to in the following description and indicated in all the views of the drawings by the same reference characters.

The device, as shown in the drawings, comprises a post or standard $h$ of any suitable or conventional construction, and a circular disk either rigidly connected with the said post or standard or adapted to be firmly locked therewith, and which carries all of the other members of the device. In the embodiment shown the disk $a$ is of annular shape and provided with radial arms $i$. The several arms $i$ are integral with and interconnected by a small central disk for rigid connection with the standard $h$ by means of bolts $k$.

Firmly attached to the peripheral or annular part of the disk $a$ are six pins or spindles $b$ projecting at right angles from the disk and arranged preferably in symmetrical order thereon so as to be equidistant or 60° apart from each other, as will be clearly seen in Figure 1. Mounted on the pins or spindles $b$ are rollers $c$ duly supported by ball bearings $b'$ for antifrictional purposes. Intermediate between the pins or spindles $b$ similar pins or rods $d$ are firmly connected with the disk by means of nuts or the like.

The rods *d* are of a somewhat greater length than the pins *b* so that they project beyond the vertical plane in which the free extremities of the pins *b* lie, as will be readily understood on inspection of Figure 2. Preferably three rods *d* are provided, as shown, symmetrically disposed, that is 120° apart from each other.

Mounted on the free ends of the rods *d* are arms or levers *e* which are loosely fitted thereon so as to allow of being displaced thereon lengthwise or in axial direction for adjusting purposes, and turned thereabout for purposes which will be explained hereinafter. The hubs of the three arms *e* are provided with suitable means, such as screws *f* for locking the same, when in adjusted or operative position.

The modified construction shown in Figs. 4 and 5 permits radial adjustment of the rollers *c* for varying the diameter of the open casing in which the coiled material is supported. Those elements of the device which are substantially identical with corresponding elements of the device shown in Figs. 1, 2 and 3 are identified by like reference characters. The supporting disk *a'* comprises a circular plate secured to standard *h* and provided with a plurality of radially extending slots *l*. The bolts *b* which carry rollers *c* are movable along slots *l* and have threads *m* receiving nuts *n* for fixing the rollers in any desired position of radial adjustment. The radial arms *e* are adjustably mounted on rods *d* which are fixed to the disk near the periphery thereof.

The operation of the device is as follows:

Prior to the insertion of a coil of wire *g* or the like the arms or levers *e* must be unlocked by unscrewing the screws *f* and turned out of the way, whereupon the coil *g* is inserted so as to adopt the position shown in Figure 1. The arms *e* then are returned to the position illustrated in Figure 1 and secured in such position by the locking screws *f*. By cutting the tying wires which are usually employed for holding the windings of the coil together, the latter will expand, owing to inherent springiness, and come in intimate contact with the rollers *c*. The coil is now ready for use, the wire being unwound from the inner periphery thereof.

While the drawings illustrate the disk and standard as arranged in vertical planes, it will be apparent that the entire assembly may be arranged at any desired angle without affecting the construction or the operation of the device. It is therefore to be understood that the terms "vertical" and "horizontal" are employed in the claims only for the purpose of defining the relative arrangement of the parts of the device.

What I claim is:—

1. A device for use in unwinding coils of wire and the like, comprising a standard, a vertically arranged disk fixed to said standard, an annularly arranged series of horizontal rollers projecting from one face of said disk, a plurality of rods projecting from the said face of said disk, arms movable along and pivotally supported by said rods, and means for securing said arms to the respective rods in the desired positions of adjustment thereon, said arms when arranged radially of said disk cooperating therewith and with said rollers to provide an open casing for supporting a coil of wire.

2. A device for use in unwinding coils of wire or the like, comprising a standard having a vertically arranged disk mounted thereon, said disk being provided with a plurality of radially extending slots, spindles adjustably secured in said slots and projecting horizontally from one face of said disk, rollers revolubly mounted on said spindles, rods fixed to said disk adjacent the periphery thereof, an arm mounted on each of said rods for movement along the same, and means for fixing said arms against said movement.

In testimony whereof, I affix my signature.

CURT MATTHAEI.